US012023928B2

(12) United States Patent
Kanzaki

(10) Patent No.: US 12,023,928 B2
(45) Date of Patent: Jul. 2, 2024

(54) LIQUID DISCHARGING HEAD

(71) Applicant: BROTHER KOGYO KABUSHIKI KAISHA, Nagoya (JP)

(72) Inventor: Shotaro Kanzaki, Handa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 92 days.

(21) Appl. No.: 17/864,511

(22) Filed: Jul. 14, 2022

(65) Prior Publication Data

US 2023/0020901 A1 Jan. 19, 2023

(30) Foreign Application Priority Data

Jul. 19, 2021 (JP) ................................ 2021-118882

(51) Int. Cl.
*B41J 2/14* (2006.01)

(52) U.S. Cl.
CPC ....... *B41J 2/14233* (2013.01); *B41J 2/14201* (2013.01); *B41J 2002/14419* (2013.01); *B41J 2202/12* (2013.01)

(58) Field of Classification Search
CPC ................ B41J 2/14233; B41J 2/14201; B41J 2002/14419; B41J 2202/12
See application file for complete search history.

(56) References Cited

U.S. PATENT DOCUMENTS 11,046,077 B2 * 6/2021 Hirai ...................... B41J 2/1433
2020/0307213 A1 10/2020 Hirai et al.

FOREIGN PATENT DOCUMENTS

JP 2020-168739 A 10/2020

* cited by examiner

*Primary Examiner* — Geoffrey S Mruk
(74) *Attorney, Agent, or Firm* — Merchant & Gould P.C.

(57) ABSTRACT

A liquid discharging head includes a stacked body in which plates are adhered to each other by an adhesive. The stacked body is provided with: individual channels including nozzles and pressure chambers, respectively, and aligned in a predetermined aligning direction, the pressure chambers being configured to be pressurized to discharge liquid from the nozzles; a supply manifold being communicated with the individual channels and supplying the liquid to the individual channels; a return manifold being communicating with the individual channels and configured to allow the liquid, which flows in the individual channels and which is not discharged from the nozzles, to flow therethrough; and a dummy channel arranged side by side with the individual channels in the aligning direction. The dummy channel is positioned at outside with respect to an outermost individual channel in the aligning direction.

9 Claims, 7 Drawing Sheets

LIQUID DISCHARGING HEAD

CROSS REFERENCE TO RELATED APPLICATIONS

The present application claims priority from Japanese Patent Application No. 2021-118882 filed on Jul. 19, 2021, the disclosure of which is incorporated herein by reference in its entirety.

BACKGROUND

The present disclosure relates to a liquid discharging head.

Conventionally, there is a known liquid discharging head provided with a supply manifold, a return manifold, a plurality of individual channels aligned in an aligning direction, and a dummy channel. Each of the plurality of individual channels is connected to one of a plurality of nozzles. The dummy channel is arranged, with respect to the plurality of individual channels, on the side of one end in the aligning direction. In each of the plurality of individual channels, a pressure chamber is connected to the supply manifold via a supply throttle channel, and is connected to the return manifold via a descender and a return throttle channel. In the dummy channel, a dummy chamber is connected to the supply manifold via a dummy supply throttle channel, and is connected to the return manifold via a dummy descender and a dummy return throttle channel.

SUMMARY

The above-described liquid discharging head is constructed by stacking a plurality of plates. For example, a plate in which the pressure chambers and the dummy chamber are provided, and another plate which is stacked on this plate are adhered to each other by an adhesive. In this configuration, in a case that the adhesive is applied or coated from the side of one end in the aligning direction, the adhesive is more likely to flow into the dummy chamber which is arranged on the side of the one end in the aligning direction as compared with the pressure chamber, rather than flowing into the pressure chamber. With this, it is possible to reduce the flowing of the adhesive into the pressure chamber, and to suppress any clogging or blocking, by the adhesive, of the supply throttle channel, etc., which is connected to the pressure chamber and which is slender.

There is, however, such a case that the adhesive flows into the dummy supply throttle channel from the dummy chamber, and the dummy channel is clogged thereby. In this case, after an ink is filled in the liquid discharging head, air remains in the dummy channel, in some cases. In such a case, if the air leaks from the dummy supply throttle channel to the supply manifold, there is such a fear that the air might enter into the individual channel(s) from the supply manifold, and thereby might cause any unsatisfactory or defective discharge (ejection) of the liquid from the nozzle(s).

The present disclosure has been made to solve the above-mentioned problem, and an object of the present disclosure is to provide a liquid discharging head capable of reducing any unsatisfactory discharge (defective discharge) of the liquid.

According to an aspect of the present disclosure, there is provided a liquid discharging head including a stacked body in which a plurality of plates is adhered to each other by an adhesive, wherein the stacked body is provided with:

a plurality of individual channels aligned in a predetermined aligning direction, the individual channels including a plurality of nozzles and a plurality of pressure chambers, respectively, the pressure chambers being configured to be pressurized to discharge liquid from the nozzles;

a supply manifold being communicated with the individual channels and configured to supply the liquid to the individual channels;

a return manifold being communicated with the individual channels and configured to allow the liquid, which flows in the individual channels and which is not discharged from the nozzles, to flow therethrough; and a dummy channel arranged side by side with the individual channels in the aligning direction, the dummy channel being positioned at outside with respect to an outermost individual channel in the aligning direction, wherein the dummy channel is unconnected to both of the supply manifold and the return manifold.

The present disclosure has the configuration as described above, and achieves the effect by which a liquid discharging head capable of reducing any unsatisfactory discharge of the liquid can be provided.

The above-described object, other objects, features, and merits of the present disclosure will become apparent from the following detailed explanation of an embodiment as described below with reference to the accompanying drawings.

DETAILED DESCRIPTION

First Embodiment

A liquid discharging apparatus 11 provided with a liquid discharging head (herein after referred to as a "head") 10 according to a first embodiment of the present disclosure is an apparatus configured to discharge a liquid. In the following, although an explanation will be given about an example wherein the liquid discharging apparatus 11 is applied to an ink-jet printer which discharges or ejects a liquid, such as an ink, etc., to a print medium A such as paper (paper sheet, sheet), etc., the liquid discharging apparatus 11 is not limited to or restricted by this.

<Configuration of Liquid Discharging Apparatus>

Figure 1:
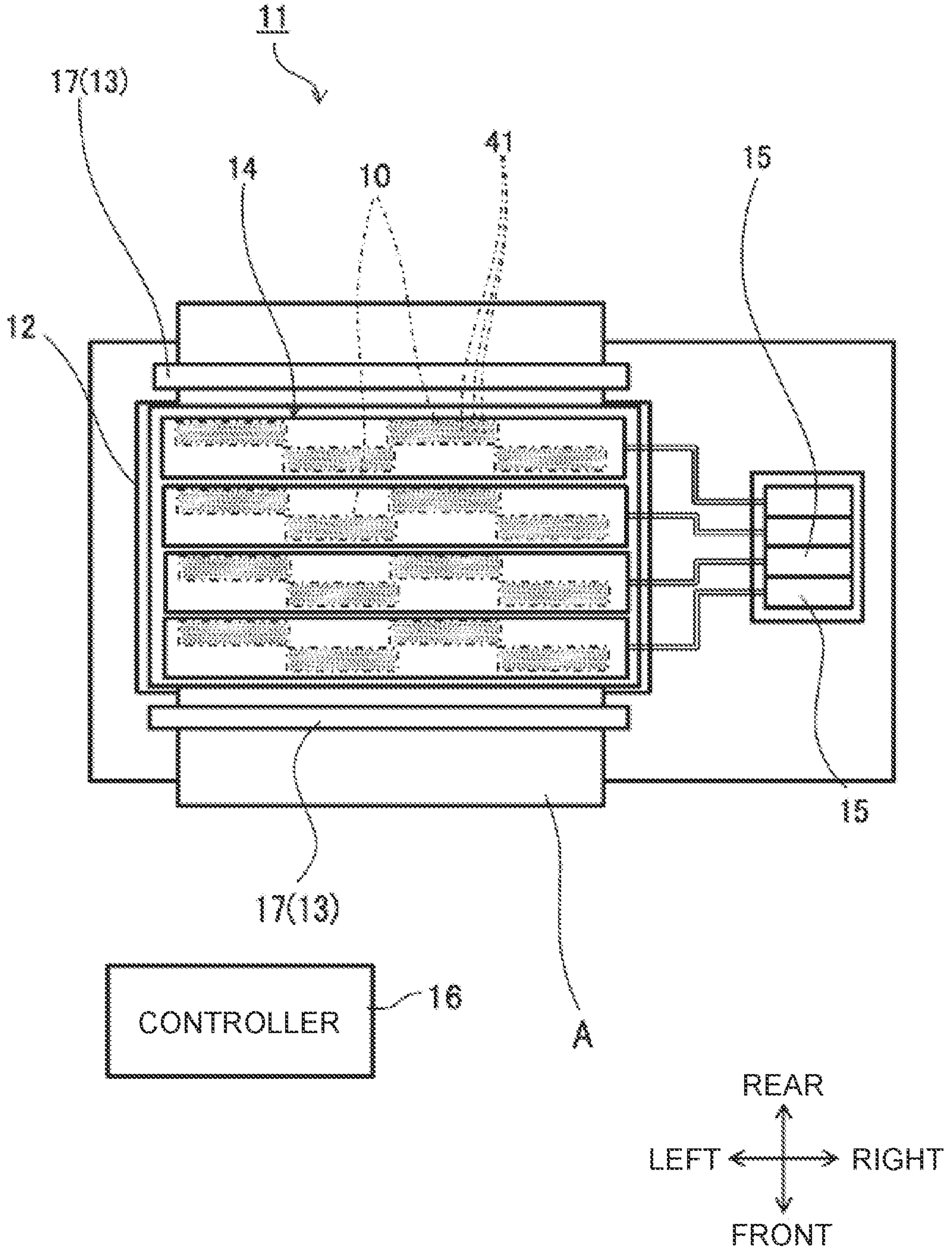
FIG. 1 is a schematic view of a liquid discharging apparatus provided with a liquid discharging head according to an embodiment of the present disclosure.

As depicted in FIG. 1, the liquid discharging apparatus 11 is provided with a platen 12, a conveyor 13, a plurality of head units 14, a storing tank 15, and a controller 16. Each of the plurality of head units 14 includes a plurality of heads 10. The liquid discharging apparatus 11 adopts a line head system. Note, however, that the system of the liquid discharging apparatus 11 is not limited to the line head system, and any other system such as, for example, a serial head system may be adopted. In a case of adopting the serial head system, the liquid discharging apparatus 11 is provided with a carriage. The carriage moves the heads 10 in a direction orthogonal to a conveying direction in which the conveyor 13 conveys the recording medium A.

The platen 12 has a flat upper surface facing or opposite to a lower surface of each of the plurality of heads 10. The recording medium A is disposed on an upper surface of the platen 11. The platen 12 determines a distance between the head 10 and the recording medium A. Note that a side of the head 10 with respect to the platen 12 is referred to as "up", and a side opposite thereto is referred to as "down". The conveying direction in which the conveyor 13 conveys a conveyance medium such as the recording medium A, etc., is referred to as a "front-rear direction". A direction orthogonal to the up-down direction and the front-rear direction is referred to as a "left-right direction". Note that, however, the arrangement of the liquid discharging apparatus 11 is not limited to this.

The conveyor 13 has, for example, two conveying rollers 17 and a conveyance motor. Each of the two conveying rollers 17 is arranged so that a rotational axis of each of the two conveying rollers 17 extends in the left-right direction. The two conveying rollers 17 are arranged so that the two conveying rollers 17 interpose the platen 12 therebetween in the front-rear direction. The two conveying rollers 17 are coupled with the conveyance motor. In a case that the conveyance motor is driven by the controller 16, the two conveying rollers 17 are rotated, thereby conveying the recording medium A on the platen 12 in the front-rear direction.

The head unit 14 and the storing tank 15 are provided for each kind of ink. For example, in a case that the liquid discharging apparatus 11 is capable of ejecting four kinds of inks, four head units 14 and four storing tanks 15 are provided on the liquid discharging head 11. For example, black, yellow, cyan and magenta inks are stored, respectively, in the four storing tanks 15. The ink of each of the four storing tanks 15 is supplied to one of the four head units 14 corresponding thereto.

Each of the four head units 14 has a length which is not less than a length in a print range in the left-right direction of the print medium A, and is provided with the plurality of heads 10. Each of the plurality of heads 10 has a plurality of nozzles 41, and each of the plurality of nozzles 41 is opened in the lower surface of each of the plurality of heads 10. The liquid is supplied from each of the four storing tanks 15 to one of nozzles included in the plurality of nozzles 41 and corresponding thereto; in a case that pressure is applied to the liquid, the liquid is discharged from each of the nozzles 41. Note that the details of the head 10 will be described later on.

The controller 16 is provided with an arithmetic circuit such as a CPU, a memory such as RAM, a ROM, etc., and a driver IC such as an ASIC. In the controller 16, the arithmetic circuit receives a variety of kinds of request and a detection signal of a sensor and causes the memory to store a variety of kinds of data. Further, the arithmetic circuit outputs a variety of kinds of execution instructions to the driver IC, based on a program stored in the memory. The driver IC controls, based on the instruction, a driving element 19 and the conveyor 13 so as to execute an operation corresponding to the instruction.

With this, a printing processing is executed. In the printing processing, the print medium A is conveyed frontward by the conveyor 13. Further, the driving element 19 is driven to thereby discharge the liquid(s) from the head(s) 10 onto the print medium A. Accordingly, an image is formed on the print medium A by the liquid, thereby performing printing.

<Configuration of Head>

Figure 2:
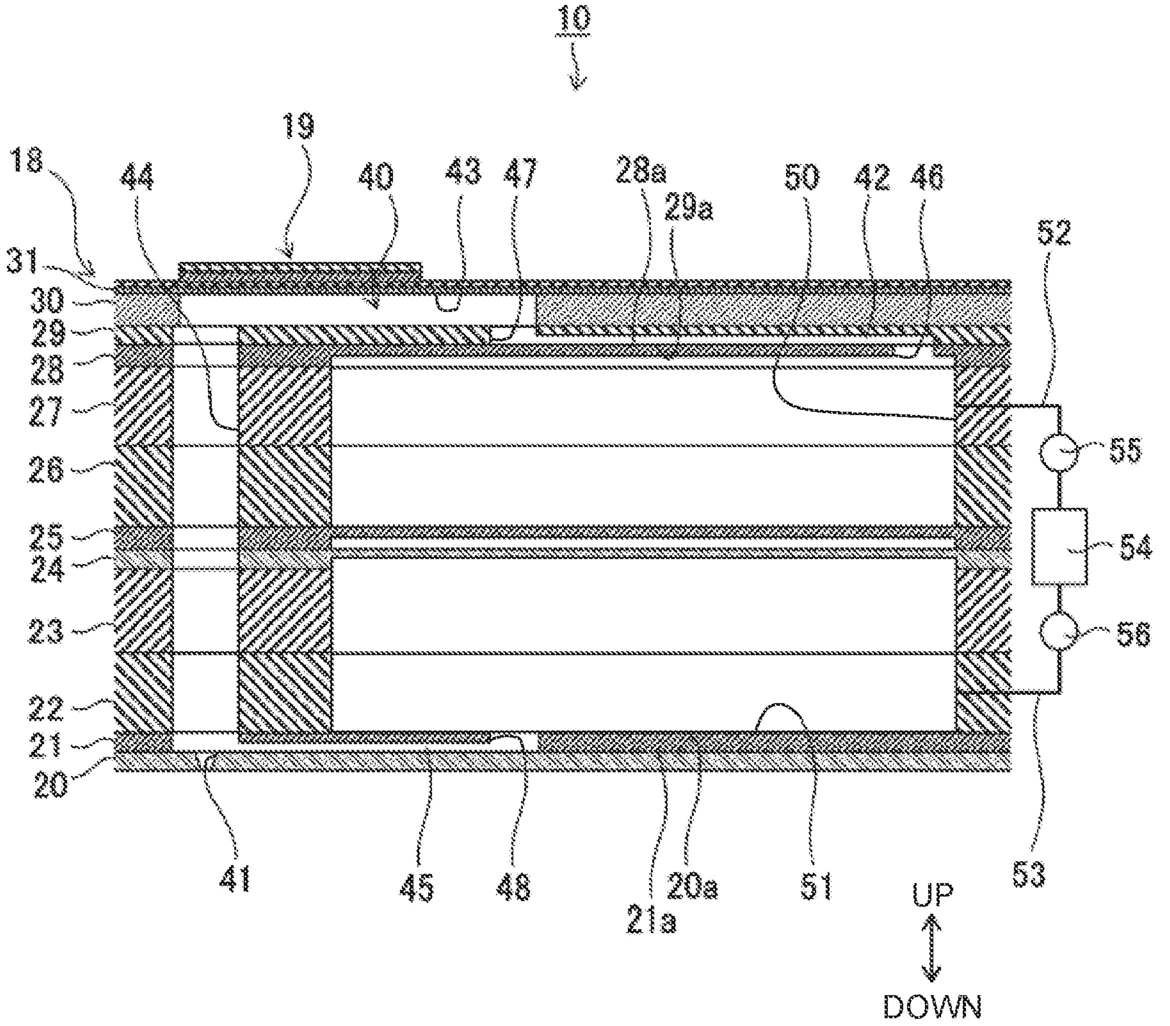
FIG. 2 is a cross-sectional view of the liquid discharging head cut with a cross section including an individual channel of FIG. 1.

As depicted in FIG. 2, the had 10 is provided with a stacked body 18 in which a plurality of plates are stacked, and the driving element 19. The plurality of plates includes, for example, a nozzle plate 20, a first channel plate 21, a second channel plate 22, a third channel plate 23, a fourth channel plate 24, a fifth channel plate 25, a sixth channel plate 26, a seventh channel plate 27, an eighth channel plate 28, a ninth channel plate 29, a tenth channel plate 30 and a vibration plate 31. These plates are sacked in this order in the up-down direction, and are adhered to one another by an adhesive. Note, however, that the number (quantity) of the plate in the stacked body 18 is not limited to this.

Figure 3:
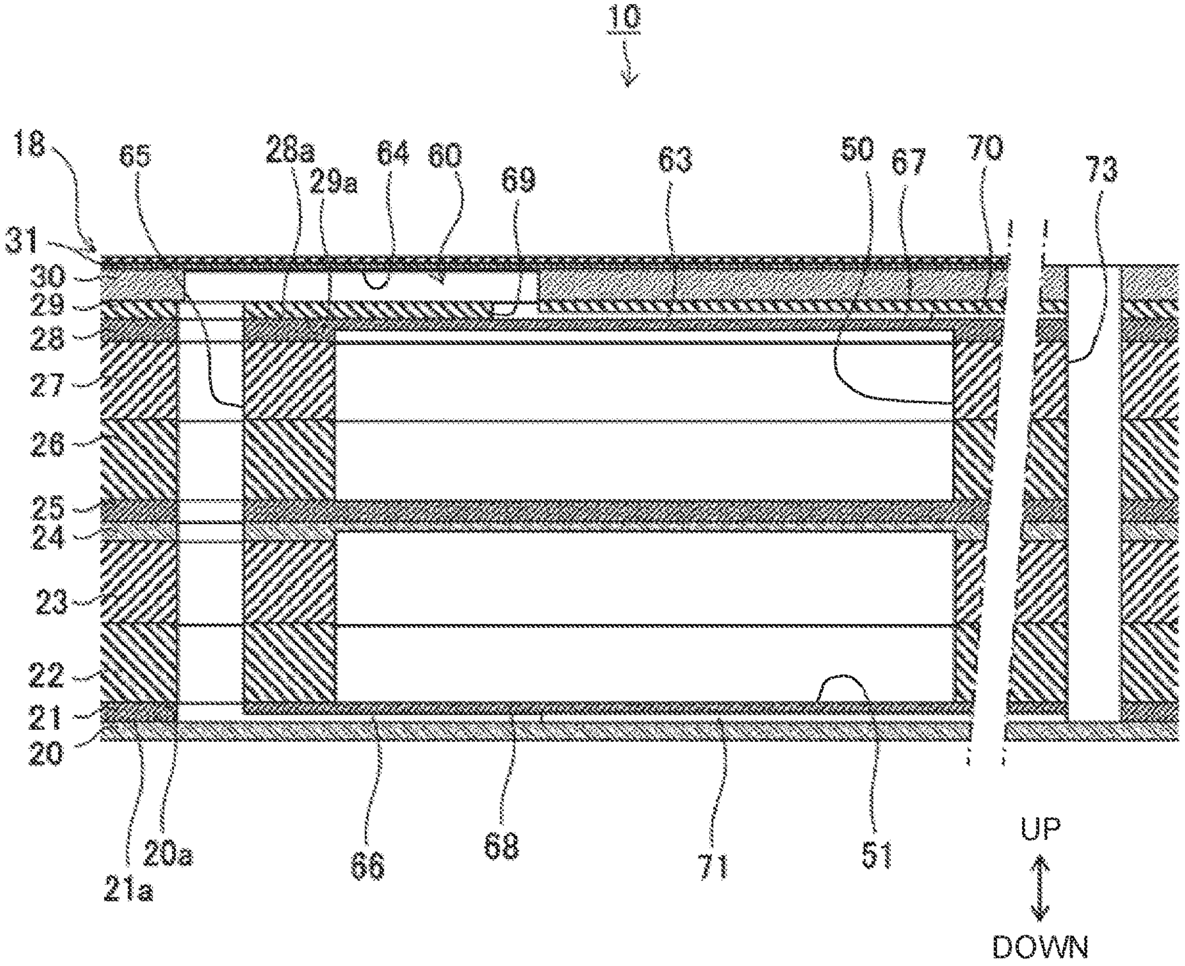
FIG. 3 is a cross-sectional view of the liquid discharging head cut with a cross section including a dummy channel of FIG. 1.

Each of the plates is formed with holes and grooves of various sizes by the etching, etc. The holes and the grooves are combined within the stacked body 18 in which the plates are stacked, thereby forming a plurality of individual channels 40, a supply manifold 50, a return manifold 51, a dummy channel 60 (FIG. 3), a first release groove 70 (FIG. 3) and a second release groove 71 (FIG. 3). Note that the details of the dummy channel 60, the first release groove 70 and the second release groove 71 will be described later on.

The supply manifold 50 is stacked on the return manifold 51. The supply manifold 50 is arranged so as to overlap with the return manifold 51 as seen from thereabove. Each of the supply manifold 50 and the return manifold 51 extends to be long in the left-right direction, and is connected to the plurality of individual channels 40.

A supply tube 52 is connected to an end in the longitudinal direction of the supply manifold 50. A return tube 53 is connected to an end in the longitudinal direction of the return manifold 51. The supply tube 52 and the return tube 53 are connected to a sub tank 54. The sub tank 54, the supply tube 52, the supply manifold 50, the plurality of individual channels 40, the return manifold 51, the return tube 53 and the sub tank 54 are connected in this order so as to construct a circulating route.

Further, the sub tank 54 is connected to each of the storing tanks 15 (FIG. 1). The liquid is supplied to the sub tank 54 from each of the storing tanks 15. A pressurizing pump 55 is provided on the supply tube 52, and a negative pressure pump 56 is provided on the return tube 53. Note that either one of the pressurizing pump 55 and the negative pressure pump 56 may be provided on the liquid discharging apparatus 11.

The supply manifold 50 is formed of through holes penetrating the sixth channel plate 26 and the seventh channel plate 27 in the up-down direction and a recessed part (concavity) formed in a lower surface of the eighth channel plate 28, the through holes and the recessed part being overlapped with one another in the up-down direction. Accordingly, a lower surface of the supply manifold 50 is defined by the fifth channel plate 25 and an upper surface of the supply manifold 50 is defined by an upper side part in the eighth channel plate 28.

The return manifold 51 is formed of through holes penetrating the second channel plate 23 and the third channel plate 23 in the up-down direction and a recessed part formed in a lower surface of the fourth channel plate 24, the through holes and the recessed part being overlapped with one another in the up-down direction. Accordingly, a lower surface of the return manifold 51 is defined by the first channel plate 21 and an upper surface of the return manifold 51 is defined by an upper side part in the fourth channel plate 24.

The plurality of individual channels 40 are aligned (arranged side by side) in the left-right direction, at equal spacing distances therebetween. Each of the plurality of individual channels 40 has a nozzle 41, a supply throttle channel 42, a pressure chamber 43, a descender 44 and a return throttle channel 45. The nozzle 41 penetrates the nozzle plate 20 in the up-down direction.

The supply manifold 50 communicates with the supply throttle channel 42 via a first communicating hole 46. The first communicating hole 46 penetrates the upper side part in the eighth channel plate 28 in the up-down direction. A lower end of the first communicating hole 46 is connected to the upper surface of the supply manifold 50.

The supply throttle channel 42 is constructed of a groove formed in a lower surface 29*a* of the ninth channel plate 29. The supply throttle channel 42 extends in an extending direction which is a direction crossing the left-right direction. A lower side of an upstream end of the supply throttle channel 42 is connected to an upper end of the first communicating hole 46. A cross sectional area, of the supply throttle channel 42, which is orthogonal to the extending direction of the supply throttle channel 42, is smaller than a cross sectional area, of the supply manifold 50, which is orthogonal to the left-right direction.

The supply throttle channel 42 communicates with the pressure chamber 43 via a second communicating hole 47. The second communicating hole 47 penetrates an upper side part in the ninth channel plate 29 in the up-down direction. A lower end of the supply throttle channel 42 is connected to an upper side of a downstream end of the supply throttle channel 42.

The pressure chamber 43 is formed to penetrate the tenth channel plate 30 in the up-down direction. The pressure chamber 43 extends in an extending direction which is a direction crossing the left-right direction. A lower side of an upstream end of the pressure chamber 43 is connected to an upper end of the second communicating hole 47. A cross sectional area, of the pressure chamber 43, which is orthogonal to the extending direction of the pressure chamber 43, is greater than the cross sectional area, of the supply throttle channel 42, which is orthogonal to the extending direction of the supply throttle channel 42.

The descender 44 has, for example, a columnar shape such as a cylindrical columnar shape, etc., and is formed of through holes each of which penetrates one of the first to ninth channel plates 21 to 29 in the up-down direction. An upper end of the descender 44 is connected to a lower end of the pressure chamber 43, and a lower end of the descender 44 is connected to an upper end of the nozzle 41.

The return throttle channel 45 is formed of a groove formed in a lower surface 21*a* of the first channel plate 21. The return throttle channel 45 extends in an extending direction which is a direction crossing the left-right direction, for example, extends in the front-rear direction. An upstream end of the return throttle channel 45 is connected to a lower part of the descender 44. A lower surface of the return throttle channel 45 is positioned in a same plane as the lower end of the descender 44. A cross sectional area, of the return throttle channel 45, which is orthogonal to the extending direction of the return throttle channel 45, is smaller than a cross sectional area, of the descender 45, which is orthogonal to the up-down direction.

The return throttle channel 45 communicates with the return manifold 51 via a third communicating hole 48. The third communicating hole 48 penetrates an upper side part of the first channel plate 21 in the up-down direction. A lower end of the third communicating hole 48 is connected to an upper side of a downstream end of the return throttle channel 45. An upper end of the third communicating hole 48 is connected to the lower surface of the return manifold 51. The cross sectional area, of the return throttle channel 45, which is orthogonal to the extending direction of the return throttle channel 45, is smaller than a cross sectional area, of the return manifold 51, which is orthogonal to the left-right direction.

The vibration plate 31 is stacked on the tenth channel plate 30, and covers an upper end opening of the pressure chamber 43. Note that the vibration plate 31 may be formed integrally with the tenth channel plate 30. In such a case, the pressure chamber 43 is formed to be recessed upward from the lower surface of the tenth channel plate 30. Further, an upper side part, in the tenth channel plate 30, with respect to the pressure chamber 43 functions as the vibration plate 31.

The driving element 19 is, for example, a piezoelectric element and is arranged on the vibration plate 31. The driving element 19 is connected to the controller 16. In a case that the driving element 19 receives a control signal from the controller 16, the driving element 19 expands and contacts in a plane direction. In response to this, the vibration plate 31 cooperates and deforms, and changes in a direction in which the volume of the pressure chamber 43 is increased or decreased. With this, a discharge pressure for discharging the liquid from the nozzle 41 is applied to the pressure chamber 43.

<Flow of Liquid>

As depicted in FIGS. 1 and 2, in a case that the pressurizing pump 55 of the supply tube 52 and the negative pressure pump 56 of the return tube 53 are driven, the liquid passes from the sub tank 54 via the supply tube 52, flows into the supply manifold 50, and flows in the supply manifold 50 in the left-right direction. During this period of time, a part of the liquid flows into each of the plurality of individual channels 40.

In each of the individual channels 40, the liquid flows from the supply manifold 50 into the supply throttle channel 42 via the first communicating hole 46, flows in the supply throttle channel 42 in the extending direction thereof. Further, the liquid flows from the supply throttle channel 42 into the pressure chamber 43 via the second communicating hole 47, and flows in the pressure chamber 43 in the extending direction thereof. Then, the liquid which flows (passes) through the pressure chamber 43 flows in the descender 44 downward, and flows into the nozzle 41. Here, in a case that the pressure is applied to the pressure chamber 43 by the driving element 19, the liquid is discharged or ejected from the nozzle 41.

The liquid, which has not been discharged from the nozzle 41 flows from the descender 44 into the return throttle channel 45, and flows in the return throttle channel 45 in the extending direction thereof. Further, the liquid flows from the return throttle channel 45 into the return manifold 51 via the third communicating hole 48. Then, the liquid flows in the return manifold 51 in the left-right direction, flows in the return tube 53 and returns to the sub tank 54. In such a manner, the liquid which has not been discharged from the nozzle 41 circulates between the sub tank 54 and each of the individual channels 40.

<Individual Channel and Dummy Channel>

Figure 4:
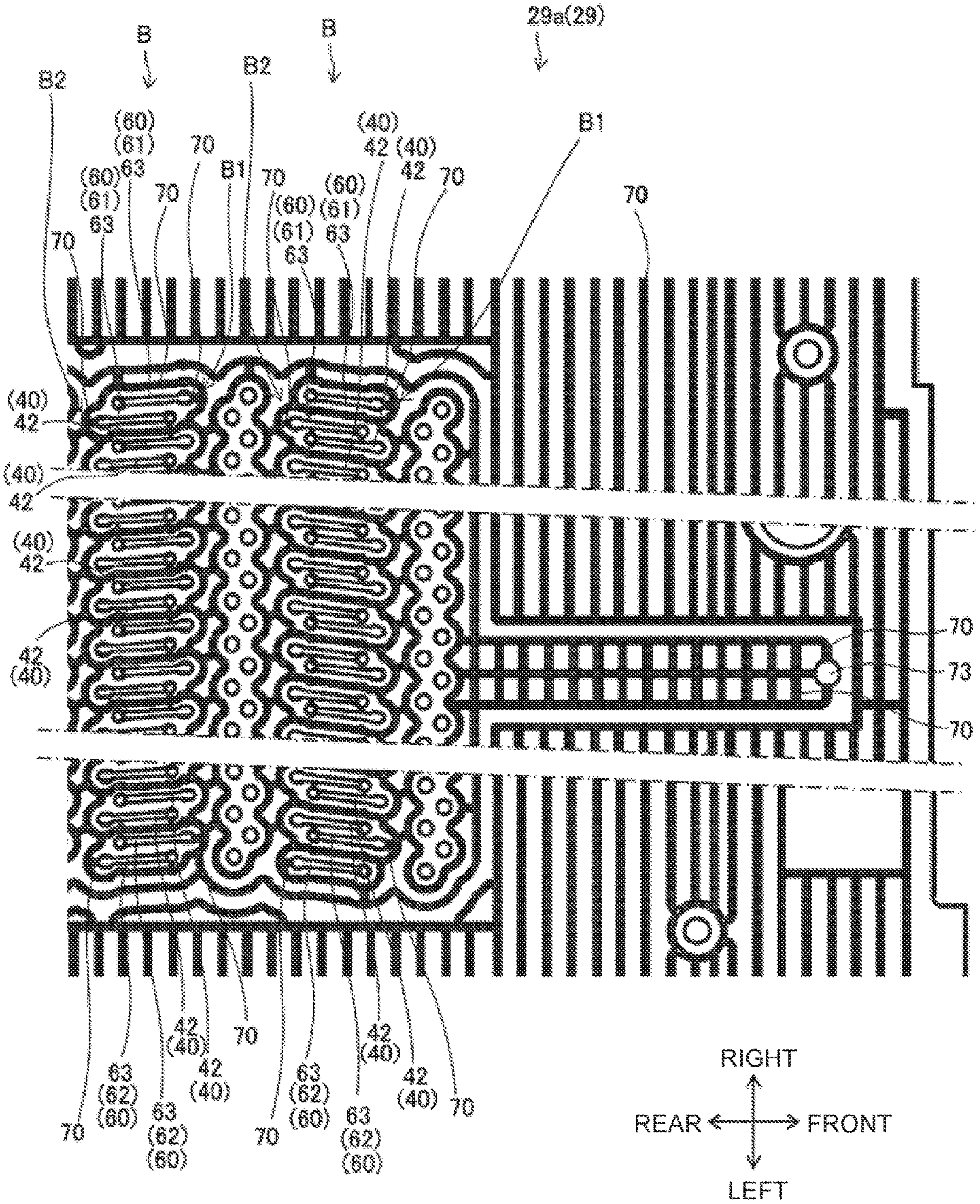
FIG. 4 is a view depicting a lower surface of a ninth channel plate.
Figure 6:
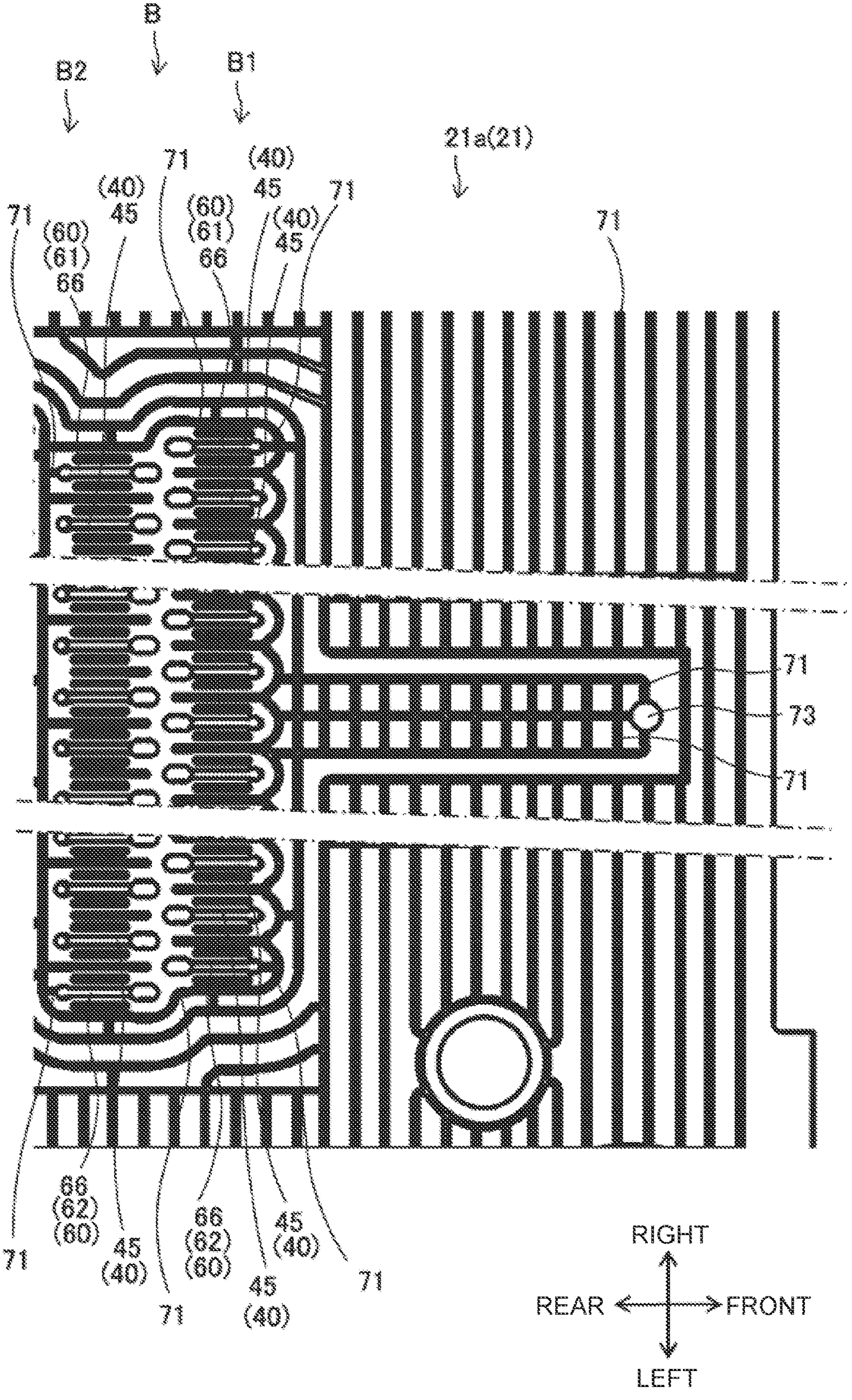
FIG. 6 is a view depicting a lower surface of a first channel plate.

As depicted in FIGS. 4 and 6, the plurality of individual channels 40 and a plurality of pieces of the dummy channel 60 are aligned in the left-right direction at a predetermined spacing distance so as to form a plurality of rows B1 and B2. The plurality of dummy channels 60 include a right-side dummy channel 61 which is arranged on a right end in each of the rows B1 and B2, and a left-side dummy channel 62 which is arranged on a left end in each of the rows B1 and B2.

In each of the rows B1 and B2, the right-side dummy channel 61 is aligned together with the individual channels 40 and the left-side dummy channel 62, side by side in the left-right direction. The right-side dummy channel 61 is arranged on the right side with respect to an individual channel 40 which is arranged on the right end among the individual channels 40 which are aligned (arranged side by side) in the left-right direction in each of the rows B1 and B2. Further, the left-side dummy channel 62 is aligned together with the individual channels 40 and the right-side dummy channel 61, side by side in the left-right direction. The left-side dummy channel 62 is arranged on the left side with respect to an individual channel 40 which is arranged on the left end among the individual channels 40 which are aligned in the left-right direction in each of the rows B1 and B2.

<Dummy Channel>

As depicted in FIG. 3, each of the plurality of dummy channels 60 has a dummy supply throttle channel 63, a dummy chamber 64, a dummy descender 65 and a dummy return throttle channel 66. Further, each of the plurality of dummy channels 60 does not have a nozzle communicating with the dummy chamber 64, and is not connected to any nozzle.

The dummy channel 60 has a first wall 67, rather than the first communicating hole 46 of the individual channel 40. The dummy channel 60 is isolated from the supply manifold 50 by the first wall 67. The first wall 67 is provided, between the supply manifold 50 and the dummy supply throttle channel 63, at an upper side part of the eighth channel plate 28. Note that the dummy channel 60 is not connected to the supply manifold 60, by the presence of the first wall 67. Owing to this, although the liquid does not flow in the dummy channel 60, for the convenience of explanation, the direction(s) in the dummy channel 60 are referred to as the upstream side and the downstream side, in correspondence to the flow direction of the liquid in the individual channel 40.

Further, the dummy channel 60 has a second wall 68, rather than the third communicating hole 48 of the individual channel 40. The dummy channel 60 is isolated from the return manifold 51 by the second wall 68. The second wall 68 is provided, between the return manifold 51 and the dummy return throttle channel 66, at an upper side part of the first channel plate 21.

The dummy supply throttle channel 63 forms a row, together with a plurality of supply throttle channels 42, each of which is the supply throttle channel 42 of one of the individual channels 40, in the left-right direction. The dummy supply throttle channel 63 has a same shape and a same size as those of each of the plurality of supply throttle channels 42. The dummy supply throttle channel 63 is constructed of a groove formed in a lower surface 29*a* of the ninth channel plate 29. The dummy supply throttle channel 63 extends in an extending direction which is a direction crossing the left-right direction. A cross sectional area, of the dummy supply throttle channel 63, which is orthogonal to the extending direction of the dummy supply throttle channel 63, is smaller than the cross sectional area, of the supply manifold 50, which is orthogonal to the left-right direction.

The dummy supply throttle channel 63 communicates with the dummy chamber 64 via a dummy communicating hole 69. The dummy communicating hole 69 penetrates an upper side part in the ninth channel plate 29 in the up-down direction. A lower end of the dummy supply throttle channel 63 is connected to an upper side of a downstream end of the dummy supply throttle channel 63.

The dummy chamber 64 is formed to penetrate the tenth channel plate 30 in the up-down direction. The dummy chamber 64 extends in an extending direction which is a direction crossing the left-right direction. A lower side of an upstream end of the dummy chamber 64 is connected to an upper end of the dummy communicating hole 69. A cross sectional area, of the dummy chamber 64, which is orthogonal to the extending direction of the dummy chamber 64, is greater than the cross sectional area, of the dummy supply throttle channel 63, which is orthogonal to the extending direction of the dummy supply throttle channel 63.

The dummy chamber 64 forms a row together with a plurality of pressure chambers 43, each of which is the pressure chamber 43 of one of the individual channels 40, in the left-right direction. The dummy chamber 64 has a same shape and a same size as those of each of the plurality of pressure chambers 43. In the left-right direction, the dummy chamber 64 and the pressure chambers 43 are aligned (arranged side by side) to form a row at constant spacing distances therebetween. Accordingly, a spacing distance between the dummy chamber 64 and the pressure chamber 43 which are adjacent to each other and a spacing distance between the pressure chambers 43 which are adjacent to each other are mutually same.

The dummy descender 65 has, for example, a columnar shape such as a cylindrical columnar shape, etc. The dummy descender 65 is formed of through holes each of which penetrates one of the first to ninth channel plates 21 to 29 in the up-down direction. An upper end of the dummy descender 65 is connected to a lower end of the dummy chamber 64. A lower end of the dummy descender 65 is covered by the nozzle plate 20.

The dummy return throttle channel 66 forms a row together with a plurality of return throttle channels 45, each of which is the return throttle channel 45 of one of the individual channels 40, in the left-right direction. The dummy return throttle 66 has a same shape and a same size as those of each of the plurality of return throttle channels 45.

The dummy return throttle channel 66 is constructed of a groove formed in the lower surface 21*a* of the first channel plate 29. The dummy return throttle channel 66 extends in an extending direction which is a direction crossing the left-right direction, for example, extends in the front-rear direction. An upstream end of the dummy return throttle channel 66 is connected to a lower part of the dummy descender 65. A lower surface of the dummy return throttle channel 66 is positioned in a same plane as the lower end of the dummy descender 65. A cross sectional area, of the dummy return throttle channel 66, which is orthogonal to the extending direction of the dummy return throttle channel 66, is smaller than a cross sectional area, of the dummy descender 65, which is orthogonal to the up-down direction.

<Supply Throttle Channel and Dummy Supply Throttle Channel>

Figure 5:
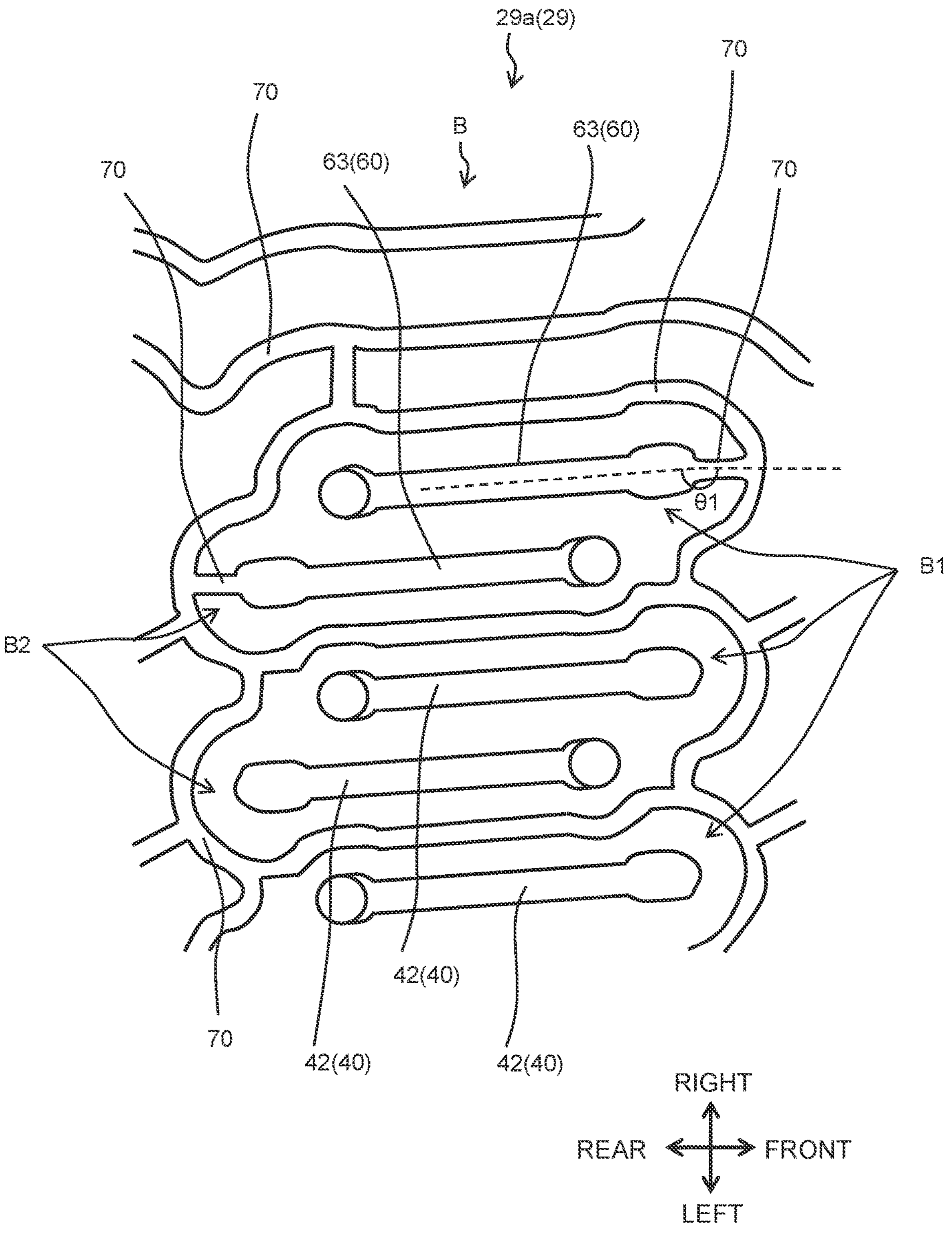
FIG. 5 is a view depicting a part of FIG. 4.

As depicted in FIGS. 4 and 5, the dummy supply throttle 63 and the plurality of supply throttle channels 42 are aligned in the left-right direction so as to form the plurality of rows B1 and B2. One piece of a front-side row B1 and one piece of a rear-side row B2 form a row B. Further, a plurality of pieces of the row B are arranged side by side in the front-rear direction, with a spacing distance therebetween. In one row B1, the throttle channels 42 and 63 of the front-side row B1 and the throttle channels 42 and 63 of the rear-side row B2 are aligned to form a row at a predetermined spacing distance in the left-right direction so that the throttle channels 42 and 63 of the front-side row B1 and the throttle channels 42 and 63 of the rear-side row B2 are alternately arranged.

Further, the dummy supply throttle channel 63 includes a right-side dummy supply throttle channel 63 which is arranged on a right end in each of the rows B1 and B2, and a left-side dummy supply throttle channel 63 which is arranged on a left end in each of the rows B1 and B2. In each of the rows B1 and B2, the right-side dummy supply throttle channel 63 is arranged together with the supply throttle channels 42 and the left-side dummy supply throttle channel 63, side by side in the left-right direction. Further, the right-side dummy supply throttle channel 63 is arranged on the right side with respect to a right-end supply throttle channel 42 which is arranged at a right end among the supply throttle channels 42 aligned in the left-right direction in each of the rows B1 and B2. Furthermore, in each of the rows B1 and B2, the left-side dummy supply throttle channel 63 is arranged together with the supply throttle channels 42 and the right-side dummy supply throttle channel 63, side by side in the left-right direction. Further, the left-side dummy supply throttle channel 63 is arranged on the left side with respect to a left-end supply throttle channel 42 which is arranged at a left end among the supply throttle channels 42 aligned in the left-right direction in each of the rows B1 and B2.

Accordingly, in the left-right direction, the right-side dummy supply throttle channel 63 of the front-side row B1 is arranged between the right end of the ninth channel plate 29 and the right-side dummy supply throttle channel 63 of the rear-side row B2. The right-side dummy supply throttle channel 63 of the rear-side row B2 is arranged between the right-side dummy supply throttle channel 63 of the front-side row B1 and the right-end supply throttle channel 42 which is on the right end of the front-side row B1.

Further, in the left-right direction, the left-side dummy supply throttle channel 63 of the front-side row B1 is arranged between the left end of the ninth channel plate 29 and the left-side dummy supply throttle channel 63 of the rear-side row B2. The left-side dummy supply throttle channel 63 of the rear-side row B2 is arranged between the left-side dummy supply throttle channel 63 of the front-side row B1 and the left-end supply throttle channel 42 which is on the left end of the front-side row B1.

In the front-side row B1, the upstream ends of the dummy supply throttle channels 63 and the supply throttle channels 42 are positioned at the front side, and that the downstream ends of the dummy supply throttle channels 63 and the supply throttle channels 42 are positioned on the rear side. In the rear-side row B2, the upstream ends of the dummy supply throttle channels 63 and the supply throttle channels 42 are positioned at the rear side, and the downstream ends of the dummy supply throttle channels 63 and the supply throttle channels 42 are positioned on the front side. In such a manner, in one row B, the dummy supply throttle channels 63 and the supply throttle channels 42 of the front-side row B1 and the dummy supply throttle channels 63 and the supply throttle channels 42 of the rear-side row B2 are arranged to be parallel to one another and to form a row in the left-right direction, while being oriented to the mutually opposite sides in the front-rear direction.

<First Release Groove>

The ninth plate 29 is provided with the first release groove 70 and an atmosphere communicating channel 73, in addition to the supply throttle channels 42 and the dummy supply throttle channels 63. Each of the supply throttle channels 42, the dummy supply throttle channels 63 and the first release groove 70 is constructed of a groove formed in the lower surface 29*a* of the ninth channel plate 29, and is opened in the lower surface 29*a*.

The atmosphere communicating channel 73 is provided on a surrounding range surrounding the periphery of a channel range in which the supply throttle channels 42 and the dummy supply throttle channels 63 are arranged in the ninth channel plate 29. As depicted in FIG. 3, the atmosphere communicating channel 73 penetrates through the first channel plate 21 to the tenth channel plate 30 in the up-down direction. An upper end of the atmosphere communicating channel 73 communicates with an outside space and is released to the atmosphere. A lower end of the atmosphere communicating channel 70 is covered by the nozzle plate 20.

As depicted in FIGS. 3, 4 and 5, the first release groove 70 is a groove configured to release an excessive adhesive, between the lower surface 29*a* of the ninth channel plate 29 and the upper surface 28*a* of the eighth channel plate 28. In a channel range of the ninth channel plate 29, the first release groove 70 has a substantially elliptical shape so as to surround the peripheries of the supply throttle channel 42 and the dummy supply throttle channel 63.

Further, the first release groove 70 is connected to an upstream end of the dummy supply release channel 63 of the front-side row B1. The first release groove 70 extends frontward linearly from a connection part thereof with respect to the dummy supply throttle channel 63 of the front-side row B1, and then is branched in the left-right direction so as to surround the periphery of the dummy supply throttle channel 63. Furthermore, the first release groove 70 is connected to an upstream end of the dummy supply release channel 63 of the rear-side row B2. The first release groove 70 extends rearward linearly from a connection part thereof with respect to the dummy supply throttle channel 63 of the rear-side row B2, and then is branched in the left-right direction so as to surround the periphery of the dummy supply throttle channel 63.

An angle θ1 defined by the extending direction of a part, of the first release groove 70, which extends linearly and the extending direction of the dummy supply throttle channel 63 is, for example, greater than 90 degrees. Accordingly, the angle between the first release groove 70 and the dummy supply throttle channel 63 is an obtuse angle, or the first release groove 70 and the dummy supply throttle channel 63 are collinear (on a mutually same line).

Further, in the surrounding range of the ninth channel plate 29, the first release groove 70 extends in the front-rear direction and in the left-right direction. Here, the first release groove 70 is connected to the atmosphere communicating channel 73. Accordingly, the dummy supply throttle channel 63 is communicated with the atmosphere communicating channel 73 via the first release groove 70, and is released to the atmosphere. A cross sectional area, of the atmosphere communicating channel 73, which is orthogonal to the up-down direction is not less than the cross-sectional area, of the dummy supply throttle channel 63, which is orthogonal to the extending direction. Further, the cross sectional area, of the dummy supply throttle channel 63, which is orthogonal to the extending direction is not less than the cross-sectional area, of the first release groove 71, which is orthogonal to the extending direction.

<Return Throttle Channel and Dummy Return Throttle Channel>

Figure 7:
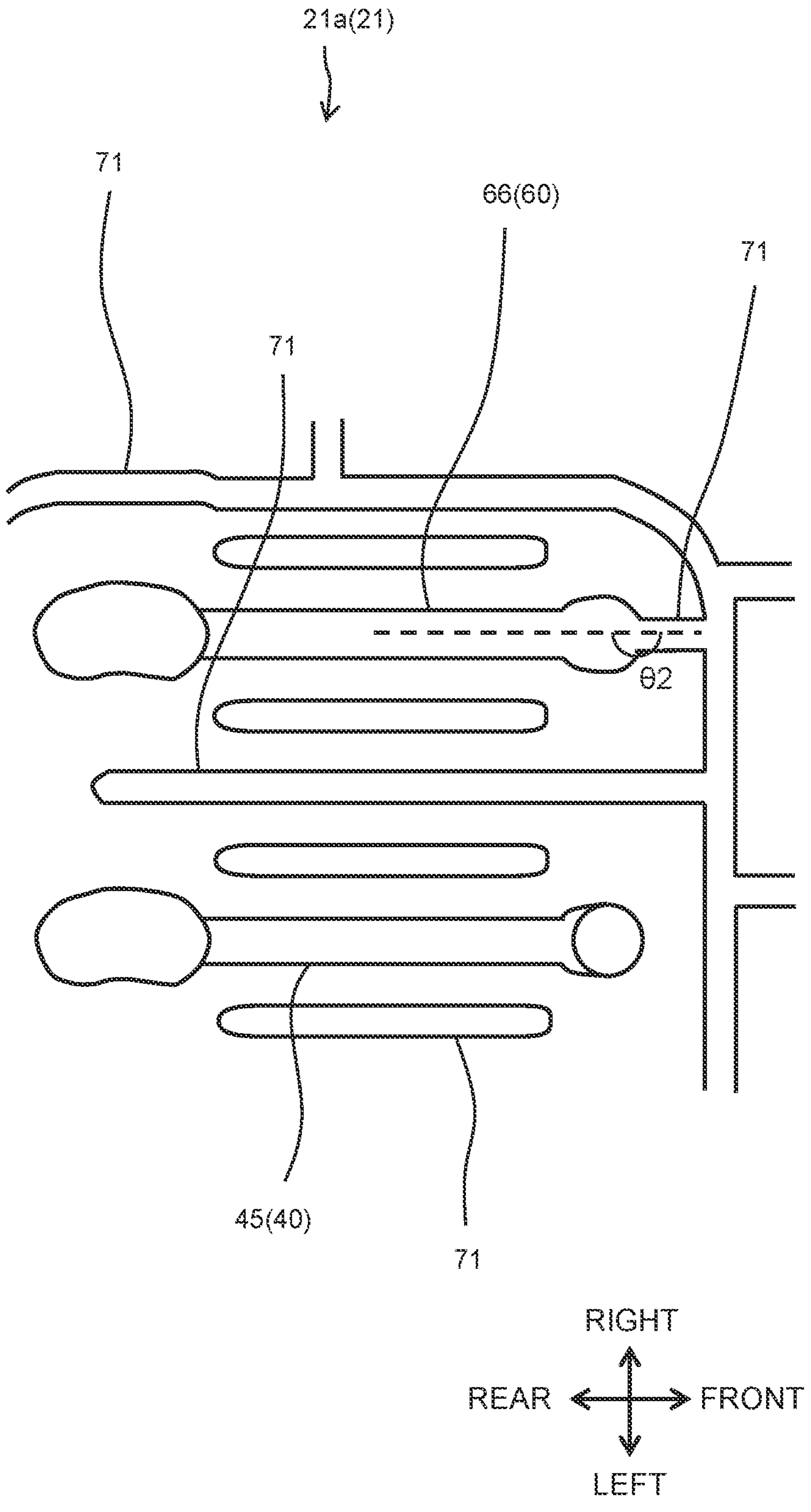
FIG. 7 is a view depicting a part of FIG. 6.

As depicted in FIGS. 6 and 7, in the front-side row B1, the upstream ends of the dummy return throttle channels 66 and the return throttle channels 45 are positioned at the rear side, and the downstream ends of the dummy return throttle channels 66 and the return throttle channels 45 are positioned on the front side. In the rear-side row B2, the upstream ends of the dummy return throttle channels 66 and the return throttle channels 45 are positioned at the front side, and the downstream ends of the dummy return throttle channels 66 and the return throttle channels 45 are positioned on the rear side. In one row B, the dummy return throttle channels 66 and the return throttle channels 45 of the front-side row B1 and the dummy return throttle channels 66 and the return throttle channels 45 of the rear-side row B2 are arranged at a spacing distance therebetween in the front-rear direction. Further, in one row B, the dummy return throttle channels 66 and the return throttle channels 45 of the front-side row B1 and the dummy return throttle channels 66 and the return throttle channels 45 of the rear-side row B2 are arranged to be parallel to one another in the left-right direction and to form a row, while being oriented to the mutually opposite sides in the front-rear direction.

Further, the dummy return throttle channel 66 includes a right-side dummy return throttle channel 66 which is arranged on the right end in each of the rows B1 and B2, and a left-side dummy return throttle channel 66 which is arranged on the left end in each of the rows B1 and B2. In each of the rows B1 and B2, the right-side dummy return throttle channel 66 is arranged on the right side with respect to a right-end return throttle channel 45 which is arranged at a right end among the return throttle channels 45 aligned in the left-right direction in each of the rows B1 and B2. The right-side dummy return throttle channel 66 is arranged together with the return throttle channels 45 and the left-side dummy return throttle channel 66, side by side in the left-right direction. Further, the left-side dummy return throttle channel 66 is arranged on the left side with respect to a left-end return throttle channel 45 which is arranged at a left end among the return throttle channels 45 aligned in the left-right direction in each of the rows B1 and B2. The left-side dummy return throttle channel 66 is arranged together with the return throttle channels 45 and the right-side dummy return throttle channel 66, side by side in the left-right direction.

<Second Release Groove>

The first channel plate 21 is provided with the second release groove 71 and the atmosphere communicating channel 73, in addition to the return throttle channels 45 and the dummy return throttle channels 66. Each of the return throttle channels 45, the dummy return throttle channels 66 and the second release groove 71 is constructed of a groove formed in the lower surface 21*a* of the first channel plate 21, and is opened in the lower surface 21*a*.

As depicted in FIGS. 3, 6 and 7, the second release groove 71 is a groove configured to release an excessive adhesive, between the lower surface 21*a* of the first channel plate 21 and the upper surface 20*a* of the nozzle plate 20. In a channel range of the first channel plate 21, the second release groove 71 has a substantially elliptical shape so as to surround the peripheries of the return throttle channel 45 and the dummy return throttle channel 66.

Further, the second release groove 71 is connected to a downstream end of the dummy return release channel 66 of the front-side row B1. The second release groove 71 extends frontward linearly from a connection part thereof with respect to the dummy return throttle channel 66 of the front-side row B1, and then is branched in the left-right direction so as to surround the periphery of the dummy return throttle channel 66. Furthermore, the second release groove 71 is connected to a downstream end of the dummy return release channel 66 of the rear-side row B2. The second release groove 71 extends rearward linearly from a connection part thereof with respect to the dummy return throttle channel 66 of the rear-side row B2, and then is branched in the left-right direction so as to surround the periphery of the dummy return throttle channel 66.

A linear part, of the second release groove 71, which extends linearly and the dummy return throttle channel 66 extend collinearly (on a mutually same line). Note that, however, it is allowable that an angle θ2 defined by the extending direction of the linear part, of the second release groove 71 and the extending direction of the dummy return throttle channel 66 is, for example, greater than 90 degrees. In such a case, the angle between the second release groove 71 and the dummy return throttle channel 66 is an obtuse angle.

Further, in the surrounding range of the first channel plate 21, the second release groove 71 extends in the front-rear direction and in the left-with direction. Here, the second release groove 71 is connected to the atmosphere communicating channel 73. Accordingly, the dummy return throttle channel 66 is communicated with the atmosphere communicating channel 73 via the second release groove 71, and is released to the atmosphere. The cross sectional area, of the atmosphere communicating channel 73, which is orthogonal to the up-down direction is not less than the cross-sectional area, of the dummy return throttle channel 66, which is orthogonal to the front-rear direction. Further, the cross sectional area, of the dummy return throttle channel 66, which is orthogonal to the front-rear direction is not less than the cross-sectional area, of the second release groove 71, which is orthogonal to the extending direction.

<Assembly of Stacked Body>

The adhesive is applied to the lower surface or the upper surface of each of the nozzle plate 20, the first channel plates 21 to the tenth channel plate 30 and the vibration plate 31, and these plates are stacked and compressed. With this, the facing surfaces which face or are opposite to each other between the respective plates are adhered to each other by the adhesive, thereby forming the stacked body 18.

Here, in order to secure the adhesion between the plates in a more ensured manner, for example, the adhesive in an amount by which an excessive adhesive is generated between the plates is applied to the lower surface 29*a* of the ninth channel plate 29, while moving a brush in the front-rear direction. Accordingly, the excessive adhesive generates in an adhesion range between the upper surface 28*a* of the eighth channel plate 28 and the lower surface 29*a* of the ninth channel plate 29. Since the cross sectional area of the supply throttle channel 42 in the lower surface 29*a* of the ninth channel plate 29 is small, there is such a fear that the supply throttle channel 42 might be clogged or blocked in a case that a large amount of the excessive adhesive flows into the supply throttle channel 42.

In view of this, since the first release groove 70 is provided on the surrounding range of the ninth channel plate 29 and the surrounding of the supply throttle channel 42, the excessive adhesive flows into and is caught by the first release groove 70. Further, also in each of the rows B1 and B2, the dummy supply throttle channel 63 is provided on the right side with respect to the right-end supply throttle channel 42, and the dummy supply throttle channel 63 is provided on the left side with respect to the left-end supply throttle channel 42. Accordingly, the excessive adhesive flows into and is caught by the dummy supply throttle channels 63, and the excessive adhesive flows from the dummy supply throttle channels 63 into the first release groove 70. Then, the excessive adhesive flows in the first release groove 70, and is further exhausted to the outside of the stacked body 18 via the atmosphere communicating channel 73. Accordingly, it is possible to suppress any clogging (blocking) of the supply throttle channel 42 which would be otherwise caused due to the excessive adhesive.

Further, in the tenth channel plate 30, the dummy chamber 64 is provided on the ride side with respect to the pressure chamber 43 at the right end, and the dummy chamber 64 is also provided on the left side with respect to the pressure chamber 43 at the left end in each of the rows B1 and B2. Accordingly, the excessive adhesive flows into and is caught by the dummy chambers 64. Accordingly, it is possible to reduce the flowing of the excessive adhesive from the pressure chambers 43 into the supply throttle channels 42, and to suppress any clogging of the supply throttle channels 42 which would be otherwise caused due to the excessive adhesive.

Further, for example, the adhesive in an amount by which an excessive adhesive is generated between the plates is applied to the lower surface 21*a* of the first channel plate 21, while moving the brush in the front-rear direction. Accordingly, the excessive adhesive generates in an adhesion range between the upper surface 20*a* of the nozzle plate 20 and the lower surface 21*a* of the first channel plate 21. Since the cross sectional area of the return throttle channel 45 in the lower surface 21*a* of the first channel plate 21 is small, there is such a fear that the return throttle channel 45 might be clogged or blocked in a case that a large amount of the excessive adhesive flows into the return throttle channel 45.

In view of this, since the second release groove 71 is provided on the surrounding range of the first channel plate 21 and the surrounding of the return throttle channel 45. Further, also in each of the rows B1 and B2, the dummy return throttle channel 66 is provided on the right side with respect to the right-end return throttle channel 45, and the dummy return throttle channel 66 is provided on the left side with respect to the left-end return throttle channel 45. Accordingly, the excessive adhesive flows into the dummy return throttle channels 66, and the excessive adhesive flows from the dummy return throttle channels 66 and into the second release groove 71. Further, the excessive adhesive is then exhausted to the outside of the stacked body 18 via the atmosphere communicating channel 73. Accordingly, it is possible to suppress any clogging (blocking) of the return throttle channel 45 which would be otherwise caused due to the excessive adhesive.

<Operation and Effect>

The head 10 has the stacked body 18 in which the plurality of plates is adhered by the adhesive. The head 10 has, in the inside of the stacked body 18, the plurality of individual channels 40, the supply manifold 50, the return manifold 51 and the dummy channel 60. Each of the plurality of individual channels 40 includes the nozzle 41 and the pressure chamber 43 to which the pressure for discharging the liquid from the nozzle 41 is applied. The plurality of individual channels 40 are aligned in the predetermined aligning direction. The supply manifold 50 communicates with the plurality of individual channels 40, and supplies the liquid to the plurality of individual channels 40. The return manifold 50 communicates with the plurality of individual channels 40, and the liquid included in the liquid flowing in the plurality of individual channels 40 and which has not been discharged from the nozzle 41 is returned to the return manifold 50. The dummy channel 60 is arranged at the outside in the aligning direction with respect to the individual channel 40, which is included in the plurality of individual channels 40 and which is arranged most closely to the end in the aligning direction. Further, the dummy channel 60 is arranged side by side with the plurality of individual channels 40, and the dummy channel 60 is not connected to (is unconnected to) both of the supply manifold 50 and the return manifold 51.

According to this, since the dummy channel 60 is arranged at the end of the plurality of individual channel 40 in the left-right direction which is the aligning direction, the adhesive is more likely to flow into the dummy chamber 60, rather than into the individual channel(s) 40. With this, it is possible to reduce the flowing of the adhesive into the individual channel 40, and to suppress any clogging or blocking, by the adhesive, of the individual channel 40. As a result, it is possible to reduce any unsatisfactory discharge from the nozzle 41 of the individual channel 40.

Further, the dummy channel 60 is not connected to the supply manifold 50. Accordingly, even in such an assumed case that the air remains in the dummy channel 60, the air does not flow from the dummy channel 60 into the supply manifold 50. Accordingly, the air does not flow from the supply manifold 50 into the individual channel(s) 40, thereby making it possible to reduce any unsatisfactory discharge of the liquid which would be otherwise caused due to the air.

Further, in the head 10, the plurality of pressure chambers 43 included, respectively, in the plurality of individual channels 40 are aligned along the aligning direction. The dummy channels 60 include the dummy chamber 64. The dummy chamber 64 is arranged side by side with the plurality of pressure chambers 43, at the outside in the aligning direction with respect to the pressure chamber 43 which is located at the end in the aligning direction among the plurality of pressure chambers 43.

According to this, a certain pressure chamber 43 which is located at the end among the plurality of pressure chambers 43 is arranged between the dummy chamber 64, which is adjacent to the certain pressure chamber 43, and the other pressure chambers 43 among the plurality of pressure chambers 43. The spacing distance between the dummy chamber 64 and the certain pressure chamber 43 at the end and the spacing distance between the certain pressure chamber 43 at the end and another pressure chamber 43 which is included in the plurality of pressure chambers 43 and which is adjacent to the certain pressure chamber 43 are same as the spacing distance between pressure chambers 43 included in the plurality of pressure chambers 43 and which are adjacent to each other. Accordingly, the binding power around the plurality of pressure chambers 43 is uniformized, and the vibration of the vibration plate 31 in the plurality of pressure chambers 43 is uniformized. As a result, it is possible to reduce any fluctuation or variation in the discharging characteristic of the liquid discharged from the nozzles 41.

Further, in the head 10, the dummy channel 60 does not have any nozzle which communicates with the dummy chamber 64. In such an assumed case that a dummy nozzle is provided on the dummy channel 60, the nozzle 41 and the dummy nozzle are opened in the lower surface of the stacked body 18. In a case that the liquid adhered to the lower surface of the stacked body 18 is wiped by a wiper, the liquid enters into the dummy nozzle, in some cases. In such a case, since the liquid is not discharged from the dummy nozzle, the liquid is hardened in the inside of the dummy nozzle. There is such a fear that the wiper might be damaged by this hardened liquid. In the present embodiment, since the dummy nozzle is not provided on the dummy channel 60, it is possible to reduce any damage to the wiper which would be otherwise caused due to the hardened liquid in the dummy nozzle.

Further, in the head 10, the dummy channels 60 include a first dummy channel 61 and a second dummy channel 62. The first dummy channel 61 is arranged at outside, in the aligning direction, with respect to an individual channel 40 included in the plurality of individual channels 40 and located at one end in the aligning direction. The second dummy channel 62 is arranged at outside, in the aligning direction, with respect to an individual channel 40 included in the plurality of individual channels 40 and located at the other end in the aligning direction.

According to this, for example, the dummy channel 60 includes the right-side dummy channel 61 as the first dummy channel 61 and the left-side dummy channel 62 as the second dummy channel 62 in the left-right direction which is the aligning direction. In this case, by applying the adhesive on the plate in the left-right direction, it is possible to easily apply the adhesive uniformly in the entirety of the surface of the plate. Further, in a case of applying the adhesive, the adhesive is more likely to flow into the right-side dummy channel 61 arranged on the right side with respect to the individual channel(s) 40 and the left-side dummy channel 62 arranged on the left side with respect to the individual channel(s) 40, rather than into the individual channel(s) 40. With these, it is possible to reduce the flowing of the adhesive into the individual channel(s) 40, and to reduce any unsatisfactory discharge (defective discharge) of the liquid.

Furthermore, in the head 10, each of the plurality of individual channels 40 includes the supply throttle channel 42 connected to the supply manifold 50 and the pressure chamber 43. The dummy channels 60 include the dummy supply throttle channel 63. The dummy supply throttle channel 63 is arranged side by side with the supply throttle channels 42 each included in one of the plurality of individual channels 40, at the outside in the aligning direction with respect to the certain supply throttle channel 42 which is included in the supply throttle channels 42 and which is positioned at the end in the aligning direction among the supply throttle channels 42. Further, the wall is provided between the dummy supply throttle channel 63 and the supply manifold 50.

Since the dummy supply throttle channel 63 is located at the end, in a case that the plates of the stacked body 18 are adhered by the adhesive, the liquid is more likely to flow into the dummy supply throttle channel 63, rather than into the supply throttle channel(s) 42. With this, it is possible to reduce the flowing of the adhesive into the supply throttle channel(s) 42 of which cross sectional area is small. As a result, it is possible to suppress the clogging of the supply throttle channel(s) 42 due to the adhesive, and to reduce any unsatisfactory discharge from the nozzle(s) 41 communicating with the supply throttle channel(s) 42.

Moreover, in the head 10, the plurality of plates includes a first plate and a second plate. The first plate is provided with the plurality of supply throttle channels 42 and the dummy supply throttle channels 63. The first plate includes a first adhesion surface in which the plurality of supply throttle channels 42 and the dummy supply throttle channels 63 are opened. The second plate includes a second adhesion surface which is adhered to the first adhesion surface by the adhesive. Further, the first release groove 70 is connected to the dummy supply throttle channels 63 in the first plate, is opened in the first adhesion surface, and communicates with atmosphere.

According to this, for example, the lower surface 29*a* of the ninth channel plate 29 which is the first adhesion surface of the first plate is adhered by the adhesive to the upper surface 28*a* of the eighth channel plate 28 which is the second adhesion surface of the second plate. In this case, the adhesive easily flows from the dummy supply throttle channel 63 into the first release groove 70 which is opened in the lower surface 29*a* of the ninth channel plate 29 and which communicates with the atmosphere; further, the adhesive is easily exhausted to the outside quickly. With this, it is possible to reduce the flowing of the adhesive into the supply throttle channel(s) 42, and to reduce any unsatisfactory discharge from the nozzle(s) 41 communicating with the supply throttle channel(s) 42.

Moreover, in the head 10, the dummy supply throttle channel 63 has one end in the extending direction of the dummy supply throttle 63 connected to the dummy chamber 64 and the other end in the extending direction connected to the first release groove 70.

According to this, in a case that the adhesive flows into the dummy supply throttle channel 63, the adhesive flows in the extending direction of the dummy supply throttle channel 63, and flows into the first release groove 70 from the other end of the dummy supply throttle channel 63. Since the adhesive flows in one direction in the dummy supply throttle channel 63 in such a manner, any remaining of the adhesive in the dummy supply throttle channel 63 is suppressed. Accordingly, the adhesive easily flows into the dummy supply throttle channel 63, thereby making it possible to reduce the flowing of the adhesive into the supply throttle channel(s) 42. As a result, it is possible to reduce any unsatisfactory discharge from the nozzle(s) 41 communicating with the supply throttle channel(s) 42.

Further, in the head 10, each of the plurality of individual channels 40 includes the return throttle channel 45 connected to the return manifold 51 and the pressure chamber 43. The dummy channels 60 include the dummy return throttle channel 66. The dummy return throttle channel 66 is arranged side by side with the return throttle channels 45, each included in one of the plurality of individual channels 40, at the outside in the aligning direction with respect to the certain return throttle channel 45 which is positioned at the end in the aligning direction among the return throttle channels 45. Further, the wall is provided between the dummy return throttle channel 66 and the return manifold 51.

Since the dummy return throttle channel 66 is located at the end in a case that the plates of the stacked body 18 are adhered by the adhesive, the liquid is more likely and easily to enter into the dummy return throttle channel 66, rather than into the return throttle channel(s) 45. With this, it is possible to reduce the flowing of the adhesive into the return throttle channel(s) 45 of which cross sectional area is small, and to suppress the clogging of the return throttle channel 45 due to the adhesive. As a result, it is possible to reduce any unsatisfactory discharge from the nozzle(s) 41 communicating with the return throttle channel(s) 45.

In the head 10, the plurality of plates includes: a third plate and a fourth plate. The third plate is provided with the plurality of return throttle channels 45 and the dummy return throttle channels 66. The third plate includes a third adhesion surface in which the plurality of return throttle channels 45 and the dummy return throttle channels 66 are opened. The fourth plate includes a fourth adhesion surface which is adhered to the third adhesion surface by the adhesive. Further, the second release groove 71 is connected to the dummy return throttle channels 66 in the third plate, is opened in the third adhesion surface, and communicates with atmosphere.

According to this, for example, the lower surface 21*a* of the first channel plate 21 which is the third adhesion surface of the third plate is adhered by the adhesive to the upper surface 20*a* of the nozzle plate 20 which is the fourth adhesion surface of the fourth plate. In this case, the adhesive easily flows from the dummy return throttle channel 66 into the second release groove 71 which is opened in the lower surface 21*a* of the first channel plate 21 and which communicates with the atmosphere; further, the adhesive is easily exhausted to the outside quickly. With this, it is possible to reduce the flowing of the adhesive into the return throttle channel(s) 45, and to reduce any unsatisfactory discharge from the nozzle(s) 41 communicating with the return throttle channel(s) 45.

OTHER MODIFICATIONS

In the above-described embodiment, the dummy channel 60 has the dummy supply throttle channel 63, the dummy chamber 64, the dummy descender 65 and the dummy return throttle channel 66. Note, however, that the dummy channel 60 may have at least one of the dummy supply throttle channel 63, the dummy chamber 64, the dummy descender 65 and the dummy return throttle channel 66. For example, it is allowable that the dummy channel 60 has the dummy chamber 64, and that the dummy channel 60 does not have the other parts different from the dummy chamber 64.

In the above-described embodiment and the modification thereof, the first release groove 70 and the second release groove 71 are provided on the stacked body 18. Note, however, that it is allowable that at least either one of the first release groove 70 and the second release groove 71 is not provided on the stacked body 18.

In the above-described embodiment and the modification thereof, the dummy channel 60 includes the first dummy channel 61 and the second dummy channel 62. Note, however, that it is allowable that the dummy channel 60 does not include one of the first dummy channel 61 and the second dummy channel 62.

In the above-described embodiment and the modification thereof, the head 10 adopts the system in which the piezoelectric element is used as the driving element 19 (piezoelectric system), the system adopted in the head 10 is not limited to this system. For example, it is allowable that the head 10 adopts, for example, a thermal system using a heating element as the driving element 19, or an electrostatic system using a conductive vibration plate and an electrode as the driving element 19.

Note that the above-described embodiment and the respective modifications may be combined with each other as long as they are not mutually exclusive. Further, from the above-described explanation, numerous improvements and/or other embodiments of the present disclosure will be apparent to those skilled in the art. Accordingly, the foregoing explanation should be interpreted as a mere example, and as being provided for the purpose of providing, to those skilled in the art, the best mode for carrying out the present disclosure. The configuration and/or the detailed function of the present disclosure may be substantially changed, without departing from the spirit of the present disclosure.

What is claimed is:

1. A liquid discharging head comprising a stacked body in which a plurality of plates is adhered to each other by an adhesive, wherein the stacked body is provided with:

a plurality of individual channels aligned in a predetermined aligning direction, the individual channels including a plurality of nozzles and a plurality of pressure chambers, respectively, the pressure chambers being configured to be pressurized to discharge liquid from the nozzles;

a supply manifold being extended to be long in the aligning direction, being communicated with the individual channels and configured to supply the liquid to the individual channels;

a return manifold being extended to be long in the aligning direction, being communicated with the individual channels and configured to allow the liquid, which flows in the individual channels and which is not discharged from the nozzles, to flow therethrough; and a dummy channel arranged side by side with the individual channels in the aligning direction, the dummy channel being positioned at outside with respect to an outermost individual channel in the aligning direction, wherein the dummy channel is unconnected to both of the supply manifold and the return manifold.

2. The liquid discharging head according to claim 1, wherein the pressure chambers are aligned along the aligning direction, the dummy channel includes a dummy chamber arranged side by side with the pressure chambers in the aligning direction, and the dummy chamber is positioned at outside with respect to an outermost pressure chamber in the aligning direction.

3. The liquid discharging head according to claim 2, wherein the dummy channel does not have a nozzle which is communicated with the dummy chamber.

4. The liquid discharging head according to claim 1, wherein the stacked body includes, as the dummy channel, a first dummy channel and a second dummy channel, the first dummy channel is arranged at outside with respect to the outermost individual channel in the aligning direction, and the second dummy channel is arranged at outside with respect to another outermost individual channel in the aligning direction.

5. The liquid discharging head according to claim 1, wherein the individual channels include, respectively, a plurality of supply throttle channels each of which is connected to the supply manifold and one of the pressure chambers, the dummy channel includes a dummy supply throttle channel arranged side by side with the supply throttle channels in the aligning direction, the dummy supply throttle channel is positioned at outside with respect to an outermost supply throttle channel in the aligning direction, and a wall is provided between the dummy supply throttle channel and the supply manifold.

6. The liquid discharging head according to claim 5, wherein the plates include:

a first plate provided with the supply throttle channels and the dummy supply throttle channel, and including a first adhesion surface in which the supply throttle channels and the dummy supply throttle channel are opened; and a second plate including a second adhesion surface which is adhered to the first adhesion surface by the adhesive, and the first plate is formed with a first release groove which is connected to the dummy supply throttle channel, which is opened in the first adhesion surface, and which is communicated with atmosphere.

7. The liquid discharging head according to claim 6, wherein the pressure chambers are aligned along the aligning direction, the dummy channel includes a dummy chamber arranged side by side with the pressure chambers in the aligning direction, the dummy chamber is positioned at outside with respect to an outermost pressure chamber in the aligning direction, and the dummy supply throttle channel extends in an extending direction, and one end in the extending direction of the dummy supply throttle channel is connected to the dummy chamber and the other end in the extending direction of the dummy supply throttle channel is connected to the first release groove.

8. The liquid discharging head according to claim 1, wherein the individual channels include, respectively, a plurality of return throttle channels each of which is connected to the return manifold and one of the pressure chambers, the dummy channel includes a dummy return throttle channel arranged side by side with the return throttle channels in the aligning direction, the dummy return throttle channel is positioned at outside with respect to an outermost return throttle channel in the aligning direction, and a wall is provided between the dummy return throttle channel and the return manifold.

9. The liquid discharging head according to claim 8, wherein the plates include:

a third plate provided with the return throttle channels and the dummy return throttle channel, and including a third adhesion surface in which the return throttle channels and the dummy return throttle channel are opened; and a fourth plate including a fourth adhesion surface which is adhered to the third adhesion surface by the adhesive, and the third plate is formed with a second release groove which is connected to the dummy return throttle channel, which is opened in the third adhesion surface, and which is communicated with atmosphere.

* * * * *